United States Patent [19]

Hidding

[11] Patent Number: 5,495,421
[45] Date of Patent: Feb. 27, 1996

[54] METHOD FOR CONTROLLING AN APPARATUS FOR PREPARING ITEMS TO BE MAILED, AND APPARATUS AND AUXILIARY EQUIPMENT FOR CARRYING OUT SUCH METHOD

[75] Inventor: Gerhard Hidding, Heerenveen, Netherlands

[73] Assignee: Hadewe B.V., Drachten, Netherlands

[21] Appl. No.: 357,977

[22] Filed: Dec. 16, 1994

Related U.S. Application Data

[63] Continuation of Ser. No. 998,590, Dec. 30, 1992, abandoned.

[30] Foreign Application Priority Data

Dec. 31, 1991 [NL] Netherlands ............... 9102198

[51] Int. Cl.⁶ .................................................. G06F 19/00
[52] U.S. Cl. .................... 364/478; 340/825.07; 364/131; 364/138
[58] Field of Search .................... 364/478, 138, 364/139, 131–134, 464.02, 464.03; 270/58; 340/825.06, 825.07, 825.52

[56] References Cited

U.S. PATENT DOCUMENTS

| | | | |
|---|---|---|---|
| 3,606,728 | 9/1978 | Sather et al. | 53/54 |
| 4,547,856 | 10/1985 | Piotroski et al. | 364/478 |
| 4,626,846 | 12/1986 | Parker et al. | 340/825.52 |
| 4,628,437 | 12/1986 | Poschmann et al. | 364/131 |
| 4,910,658 | 3/1990 | Dudash et al. | 364/138 |
| 5,016,184 | 5/1991 | Gutjahr | 364/476 |
| 5,148,433 | 9/1992 | Johnson et al. | 340/825.52 X |
| 5,195,183 | 3/1993 | Miller et al. | 340/825.07 X |

FOREIGN PATENT DOCUMENTS

| | | |
|---|---|---|
| 0325692 | 8/1989 | European Pat. Off. . |
| 0372085 | 6/1990 | European Pat. Off. . |
| 0376738 | 7/1990 | European Pat. Off. . |
| 0434986 | 7/1991 | European Pat. Off. . |
| 0471846 | 2/1992 | European Pat. Off. . |
| 3904649 | 8/1990 | Germany . |
| WO90/14621 | 11/1990 | WIPO . |

*Primary Examiner*—Joseph Ruggiero
*Attorney, Agent, or Firm*—Burns, Doane, Swecker & Mathis

[57] ABSTRACT

Via a data channel, a central data processor is connected to a plurality of data processors each associated with a station. Communication between the data processors associated with stations and at least the central data processor occurs via said data channel. The data processors each associated with a station are selectively activated for communication via the data channel in response to given control signals, According to the invention, data processors each associated with a station are connected to connections associated with the position of the associated stations in the apparatus.. The connection to which a data processor is connected determines in response to which of the control signals the data processor is activated, Thus, the central processor is simply and automatically provided with information regarding the positions of the stations in the apparatus.

19 Claims, 4 Drawing Sheets

_5,495,421_

METHOD FOR CONTROLLING AN APPARATUS FOR PREPARING ITEMS TO BE MAILED, AND APPARATUS AND AUXILIARY EQUIPMENT FOR CARRYING OUT SUCH METHOD

This application is a continuation of application Ser. No. 07/998,590, filed Dec. 30, 1992 now abandoned.

BACKGROUND OF THE INVENTION

The invention relates to a method for controlling an apparatus for preparing items to be mailed, comprising a plurality of successive stations, a central data processor, a plurality of data processors each associated with a station, and a data channel by means of which the processors are connected, in which method communication between the data processors associated with stations and at least the central data processor occurs via said data channel, and the data processors each associated with a station are selectively activated for communication via the data channel in response to given control signals.

Such a method is known from U.S. Pat. No. 4,547,856.

U.S. Pat. No. 3,606,728 discloses an apparatus for preparing items to be mailed, comprising a plurality of successive stations, which can be controlled depending on processing instructions stored in a data processor. Each station is connected to the data processor via a separate line. This involves the drawback that a great deal of cabling is necessary, which, moreover, must be specifically adapted to the configuration of the apparatus.

In the method known from the above-mentioned more recent U.S. Pat. No. 4,547,856, the control signal is formed by an address signal, which is transmitted via a bus. The address signal activates a data processor associated with a station for receiving a control signal, when this address signal corresponds with the address code stored in that processor. Data regarding the configuration of the apparatus are recorded in a PROM installed in the apparatus.

With this form of communication, not every processor associated with a station requires a separate connection with the central processor, so that the cabling can be of relatively simple design and the apparatus can be built up of modules. It is a drawback, however, that in case of modification of the configuration an adapted PROM must be installed and that disturbance may be caused by errors made in assigning addresses to the processors associated with the stations and in programming the PROM accordingly.

The even more recent European patent application 0,376, 738 discloses a method for controlling an apparatus for preparing items to be mailed, in which method the stations communicate with previous and succeeding, adjacent stations via a one-directional and a two-directional bus and communicate directly with a central processor via a third bus. The configuration of the apparatus is determined at start-up by transmitting a data base in one direction along the data processors of successive stations, each adding its respective identification data to the base. The configuration of the apparatus appears from this data base and the order of the identification codes therein. An advantage of this apparatus over the other systems discussed above is that in case of modification of the configuration, the data base regarding the configuration automatically adapted.

However, a drawback of the method described in European patent application 0,376,738 is that its implementation requires a complicated communication structure, comprising three communication levels and three buses.

SUMMARY OF THE INVENTION

The object of the invention is to provide a method for controlling an apparatus for preparing items to be mailed, comprising a plurality of successive stations, which method permits simple modification of the configuration of the apparatus and can be carried out with a simple control structure.

This object is achieved in accordance with the present invention, in that, in a method as described in the preamble, at least a number of the data processors each associated with a station are each connected to a connection which is associated with the position of the associated station in the apparatus, whilst the connection to which a data processor is connected determines in response to which of the control signals that data processor is activated.

In the method according to the present invention, the communication between the central data processor and the processors associated with the stations can be effected via a single data channel, while the configuration of the apparatus can be determined automatically in a simple manner because the control signals for the data processors of the stations are coupled to the positions of those stations. If a station is replaced with another station, then this other station, at least at start-up, will be activated as the replaced station by a corresponding control signal associated with that connection.

The invention is based on the insight that if the control signal for activating a data processor associated with a station and connected to a shared data channel, is made dependent, not on the identity of that station or that data processor, but on the position where the station is arranged in that apparatus, then the information regarding the configuration, relevant to the control of the apparatus for preparing items to be mailed, can be gathered automatically in a simple manner, because, in addition to information regarding the identity of the stations present in the apparatus, information about the positions of those stations is obtained at the same time in a simple manner.

Whenever the configuration is modified, the data regarding the configuration, stored in the central data processor, can be adapted simply and automatically. The method is therefore particularly suitable for apparatuses for preparing items to be mailed, comprising detachable stations in which the associated data processors have been incorporated. The method according to the invention is also advantageous for use in apparatuses of fixed configuration, inasmuch as the laborious input of the configuration into the central processor has been rendered unnecessary.

A further advantage of the present invention is that it precludes any differences between data regarding the configuration, stored in the central processor, and the actual configuration, due to errors made in inputting those data.

The invention can also be embodied in an apparatus for carrying out the method according to the invention, as well as in a transport unit or a connection unit which is adapted for use in an apparatus for carrying out the method according to the present invention.

DETAILED DESCRIPTION OF THE INVENTION

Figure 1:
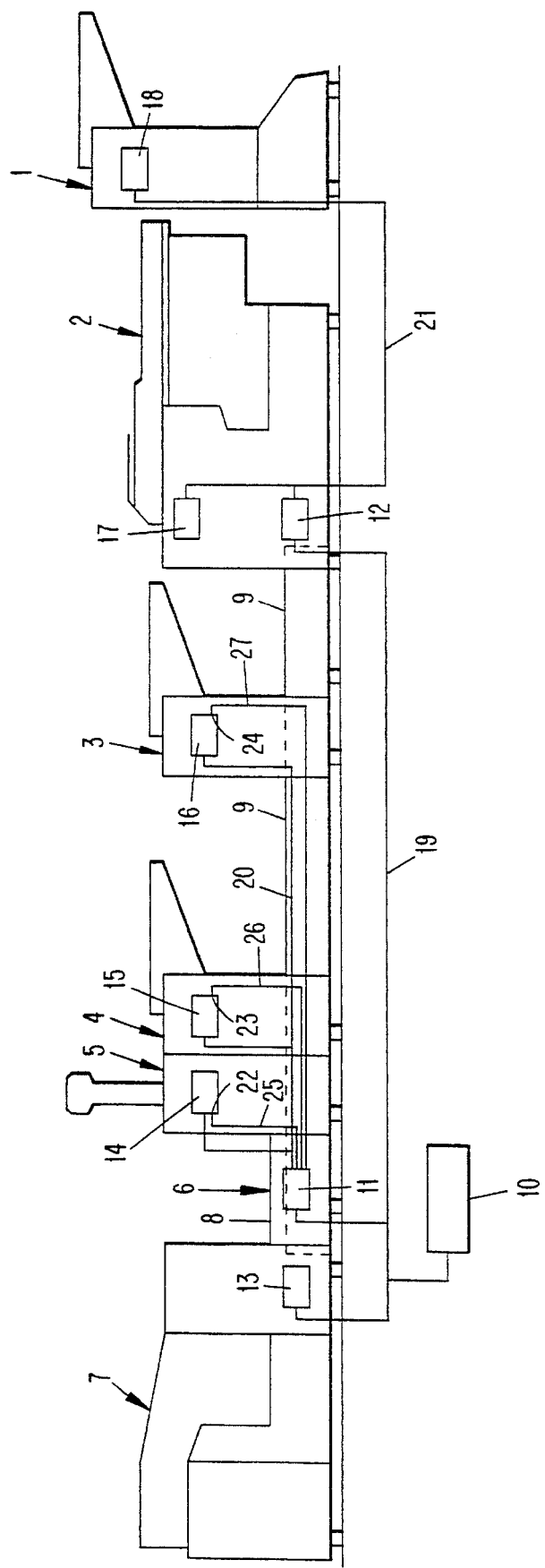
FIG. 1 is a side elevation of a schematically represented control system of an apparatus for preparing items to be mailed, according to a preferred embodiment of the invention.

FIG. 1 shows an apparatus for preparing items to be mailed with a plurality of successive stations, according to an embodiment of the invention that is preferred most. The stations are, in succession, a feeding station 1 for feeding loose sheets, a gathering station 2, a first and a second enclosure feeding station 3 and 4, respectively, a folding station 5, a transport unit 6 and an inserter station 7. For the mechanical components of the apparatus for preparing items to be mailed according to the exemplary embodiment shown, stations can be used which, as to construction, substantially correspond to stations of a product line marketed by assignee under the name of "System 7".

The feeding station 1 is suitable for feeding loose sheets to the gathering station 2. In the gathering station 2, the sheets received from the feeding station 1 can optionally be gathered to form stacks, which may each, for instance, form a set of documents to be processed into a postal item. Subsequently, the sheets or stacks of sheets can be passed along the enclosure feeding stations 3 and 4, where, optionally, enclosures are added. In the folding station 5, the sheets and enclosures are folded. If sheets and enclosures have been gathered to form a stack upstream of the folding station 5, they are folded simultaneously, as a stack. The transport unit 6 comprises a control unit 8 and a transport track 9, to which are coupled the inserter station 7, the folding station 5, the enclosure feeding stations 3, 4 and the gathering station 2. The folding station 5 and the enclosure feeding stations 3, 4 have a greater width than the transport track and have been arranged from above over the transport track 9.

The apparatus for preparing items to be mailed according to the exemplary embodiment shown in FIG. 1, further comprises a main processor 10, a first central data processor 11 for the transport unit 6, a folding station 5 and the enclosure feeding stations 3, 4, and a second central data processor 12 for the feeding station 1 and the gathering station 2, as well as a plurality of data processors 13, 14, 15, 16, 17, 18, each associated with a station. The central data processors 11, 12, the main processor 10 and the data processor 13 associated with the inserter station are interconnected via a data channel 19, for instance a RS-232C bus. The central data processor 12 in the gathering station 2 is connected to the processor 17 of the gathering station 2 and the processor 18 of the feeding station 1 via a data channel 21. The central data processor 11 in the transport unit 6 is connected to the data processors 15, 16 of the enclosure feeding stations 3 and 4 as well as the data processor 14 of the folding station 5 via a data channel 20. The two last-mentioned data channels can for instance be formed by I²C buses. Each of the data processors 13–18 associated with a station can be activated by a control signal, for data communication via the data channel 19, 20 or 21 to which it is connected.

The data processors can for instance be designed as a single chip microcomputer (for instance Intel 8051) with extensions, such as the Philips PCB80C552. In such a data processor, a large number of functions are integrated.

For controlling a multi-station apparatus for preparing items to be mailed, the control system must know not only the data regarding the stations present, but also the position of those stations, since the positions of the stations determine the order in which a sheet to be processed passes the stations, and hence the time at which a process operation relating to a given article (for instance, the addition of a single enclosure) is to be performed by a given station.

To that end, the data processor 14 of the folding station as well as the data processors 15 and 16 of the enclosure feeding stations 3 and 4 are connected to position-bound connections 22, 23 and 24, respectively, which connections determine in reaction to which control signals the respective data processors 14, 15, 16 connected thereto, can be activated. Because the control signals are position-bound, it is ensured that the correct information about the configuration as regards the stations 3, 4 and 5 arranged over the transport track 9 is stored in the central processor 11 in the transport unit 6. If the enclosure feeding stations 3 and 4 are interchanged, then the instructions intended for the first enclosure feeding station 3, viewed in the direction of transport, will still be transmitted to the first enclosure feeding station as viewed in the direction of transport, i.e., in this case enclosure feeding station 4.

The position-bound connections 22, 23, 24 are connected to the central data processor 11 in the transport unit 6 via individual separate selection lines 25, 26 and 27, respectively.

For activating a data processor 14, 15 or 16 connected to a selected connection 22, 23 or 24 for communication via the data channel 20, the control signal is transmitted via the selection line 25, 26 and 27, respectively, associated with that selected connection 22, 23 and 24, respectively. The control signal can be a very simple signal that is identical for all selection lines, for instance the application of a potential difference with the ground to the selection line that is connected to the connection to which the data processor to be controlled is connected.

According to the embodiment shown in FIG. 1, the transport unit 6 comprises a plurality of station mounting positions (not shown in the drawings), these mounting positions each being equipped with one of the above-mentioned, schematically represented connections 22, 23, 24. The data channel 20 is built into the transport unit 6. Thus, when a station is connected to the transport unit, it is automatically connected to the correct selection line 25, 26, 27.

The control signals for the selective activation of the data processors 14, 15 and 16 connected to connections 22–24, for communication via the data channel 20, can be transmitted exclusively via the selection lines 25, 26 and 27. This offers the advantage that the data channel 20 is not loaded by the transmission of control signals in the form of identification or address signals associated with a given processor.

It is also possible, however, at start-up of the apparatus, to activate successively each data processor connected to one of the above-mentioned connections 22, 23, 24 for communication via the data channel 20. In that case, the central data processor 11 transmits a message via the data channel 20, this message comprising a unique control code, which is stored in the activated data processor 14, 15 or 16. Then, for activating that data processor 14, 15 or 16 in operation, a unique control signal is transmitted via the data channel 20, this unique control signal corresponding to the unique control code stored in that data processor 14, 15 or 16.

This offers the advantage that, after start-up, the selection lines 25, 26, 27 are available for other functions. Because the control codes are assigned to the data processors 14, 15, 16 of the stations 3, 4 and 5, disturbance due to the use of divided processors with identical or identically set control signals is avoided.

Instead of assigning a control code to the data processors 14, 15, 16 associated with the stations 3, 4, 5, it is possible that, when at start-up of the apparatus each data processor 14, 15, 16 connected to one of the above-mentioned connections 22, 23, 24 is successively activated for communication via the data channel 20, the activated data processor 14, 15, 16 transmits a message via the data channel, this message comprising a unique control code which is stored in the central data processor 11 in relation to the selection line 25, 26 or 27, and hence the connection 22, 23 or 24 to which the activated data processor 14, 15 or 16 is connected. For activating that data processor 14, 15 or 16 in operation, a unique control signal, corresponding with the above-mentioned control code, is transmitted via the data channel 20.

This manner of programming the control codes offers the advantage that the control code can be linked to certain fixed operations to be performed by a station 3, 4 or 5, such as the feeding of a particular enclosure document.

The control code associated with the enclosure document can for instance be set by operating the station 3 or 4. At start-up, the central processor is automatically informed of which operations can be performed at which positions. On the basis of processing instructions which are associated with a document supplied by the feeding station 1, and comprise a processing code corresponding with the control code set at the station, and have been received by mediation of the main processor 11, the central processor 11 can then determine at what time which data processor must be activated, so as to add to the document an enclosure corresponding with the processing code.

Figure 2:
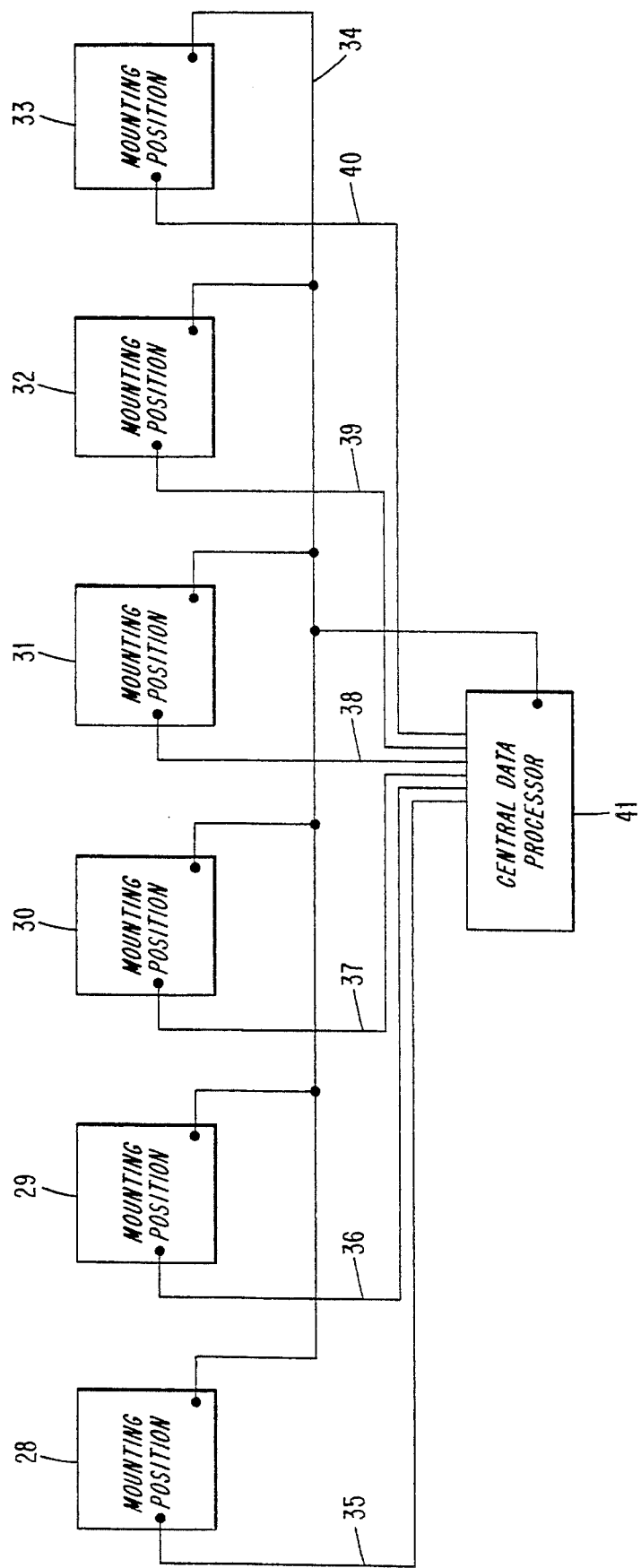
FIG. 2 is a schematic representation of a control system of a transport unit of an apparatus for preparing items to be mailed, according to an embodiment of the invention.
Figure 3:
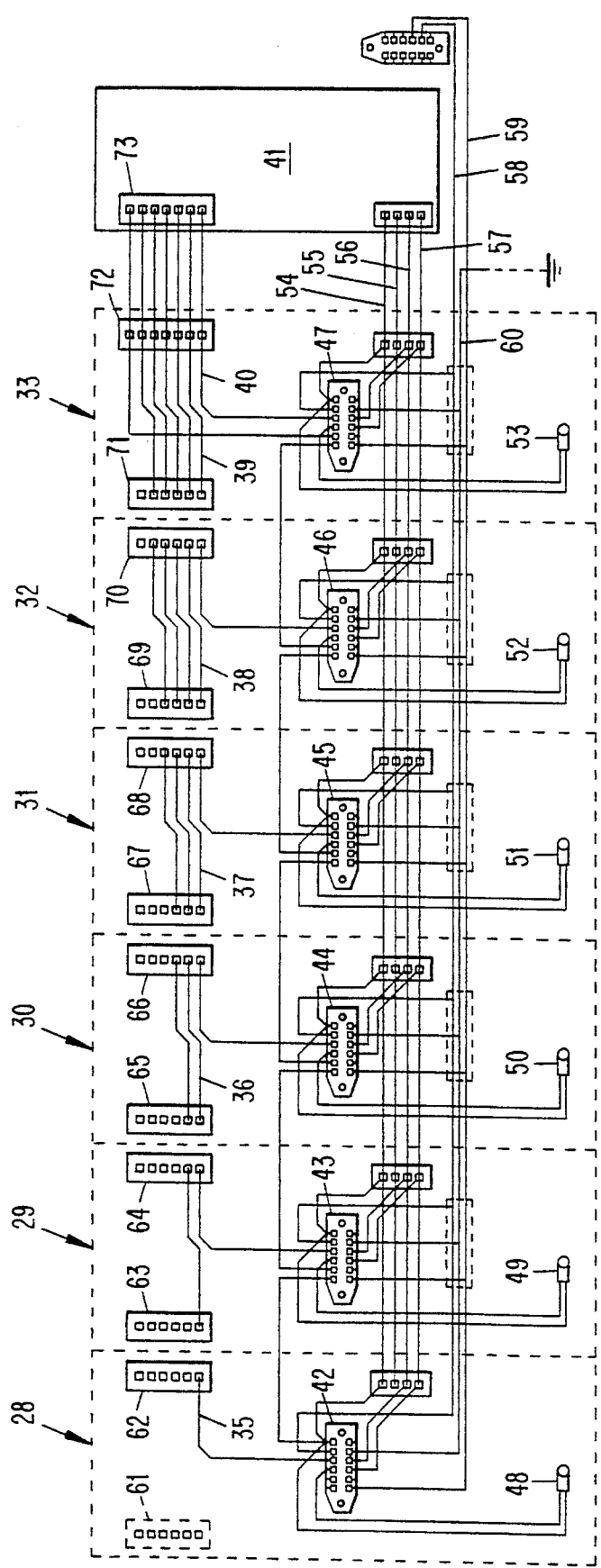
FIG. 3 is a cable diagram of a transport unit according to FIG. 2.

FIGS. 2 and 3 show a diagram and a cable diagram of a transport unit of an apparatus for preparing items to be mailed, according to a second embodiment of the invention.

This transport unit comprises six connections 42–47 for data processors that form part of mounting positions 28–33 for the associated stations. The connections 42–47 are each connected to an associated individual selection line 35–40. The selection lines 35–40 are each connected to a central data processor 41. The connections 42–47 are further connected with lines 54–57, forming a common bus, to which the central data processor 41 is also connected. Via this bus, control signals and data are exchanged between the central processor 41 and the divided data processors (not shown) connected to the connections 42–47.

At each connection, the transport unit is provided with a sensor 48–53 for detecting passing articles transported by the transport unit, which sensor 48–53 is connected to the selection line 35–39 associated with the corresponding connection 42–47. The sensor can for instance be designed as a photosensitive cell capable of observing an interruption of light emitted by an oppositely located lamp.

After the control codes for activating the data processors each associated with a station have been stored, each of the sensors 48–53 transmits a signal to the central processor 41 via the associated selection line 35–39, which signal is dependent on the presence of a sheet in front of the sensor 48–53.

Any disturbance of the transport of the sheets can be reported directly to the central data processor 41, for instance on the basis of a signal being received continuously for too long, indicating that in front of a particular sensor at least one sheet or, conversely, no sheet is present. Via the selection lines 35–39, the transport of the sheets can be monitored continuously without loading the communication bus formed by the lines 54–57. Disturbance can moreover be established when the signal received via the selection line at a given time has a value different from the normal value in that stage of a processing cycle.

Arranging the sensors in the transport unit offers the advantage that even if no station is arranged at a given mounting position of the transport unit, the transport of sheets along that mounting position can still be monitored.

Lines 58, 59 and 60 respectively form the supply and the grounding of the transport unit.

FIG. 3 shows only the operative portions of the cables of the selection lines 35–39. However, each of the mounting positions 28–32 can be made of a construction identical to the mounting position 33. Because the cabling "jumps" between a right-hand selection line connector 62, 64, 66, 68, 70, 72 and a left-hand selection line connector 61, 63, 65, 67, 69, 71, respectively, the position of the mounting position determines to which connecting point of the selection line connector 73 of the central data processor 41 the connection 43, 44, 45, 46 and 47, respectively, and the sensor 48, 49, 50, 51, 52 and 53, respectively, are connected.

As a consequence, the transport unit can be of modular design and be adapted in length to the desired number of stations and the mounting position modules are interchangeable. The transport unit according to the embodiment shown in FIGS. 2 and 3 can comprise a maximum of six mounting positions. By extending the number of pins of the selection line connectors, the maximum number of mounting positions can be increased.

Such cabling, jumping between selection line connectors on opposite sides of a position, can also be incorporated directly in each station, instead of being arranged in a transport unit with mounting positions. In that case, too, the position of each station determines to which of the connecting points of the selection line connector of a central data processor that station is connected.

In the embodiments of the invention described hereinabove, at least a number of the data processors each associated with a station are connected to central data processors of the apparatus, these central data processors in turn being connected to a central main processor of the apparatus. Naturally, it is also possible to connect each of the data processors associated with a station directly to the main processor.

The data processors that are associated with stations having a fixed position, such as the inserter station 7, the gathering station 2 and the feeding station 1 can be activated with a fixed control code associated with that type of station, which simplifies the control of the apparatus. If, in that case, a separate bus is used for communication with position-dependent control, the data processors of the other stations can communicate via a simple standard bus.

Figure 4:
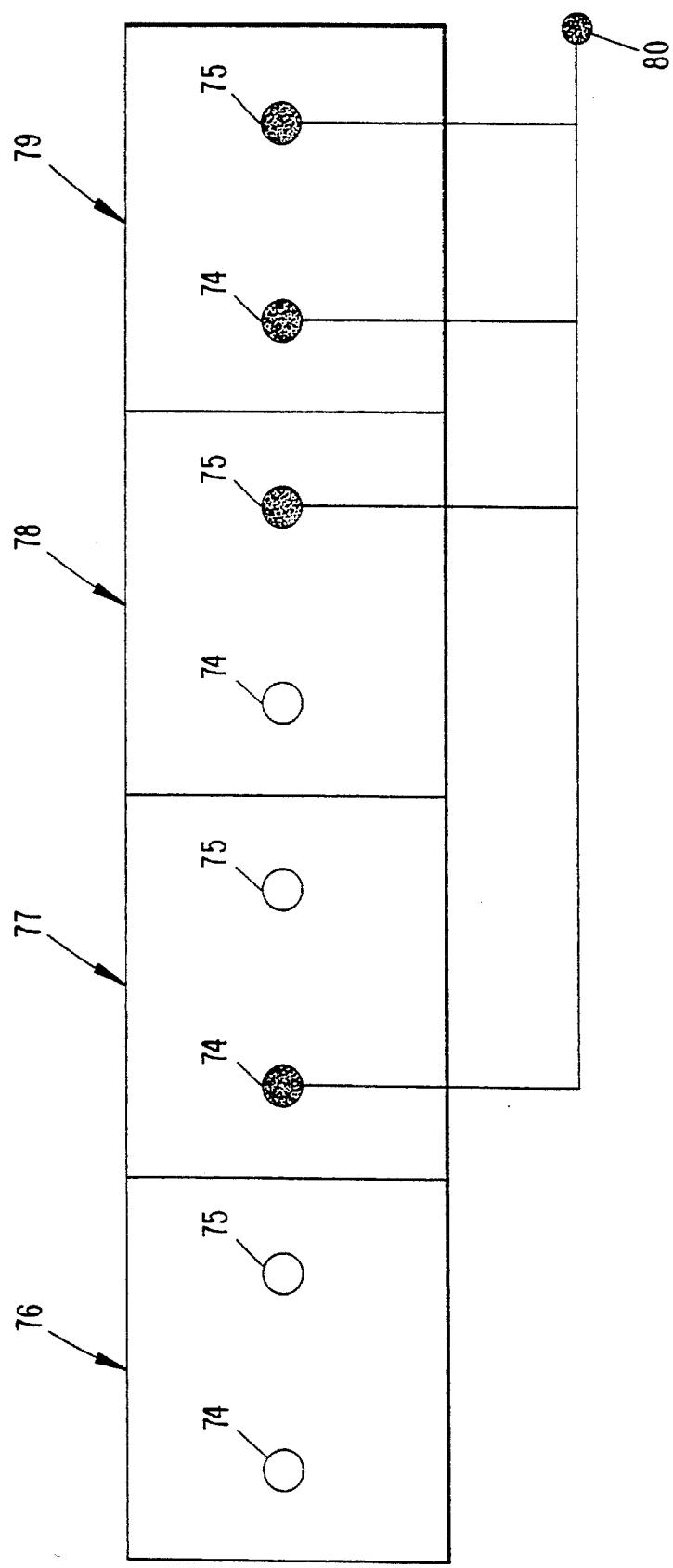
FIG. 4 is a schematic representation of connections of a transport unit according to a further embodiment of the invention.

According to an alternative embodiment of the invention, schematically represented in FIG. 4, a first connection 79 and a next connection 78 for a data processor associated with a station each comprise at least one connecting point 74. A given connecting point 74 of the first connection 79 is connected to a point 80 common for all connections and the corresponding connecting point 74 of the next connection 78 is not connected to that point 80. The respective data processors (not shown) connected to the first and the next connection are equipped with a memory for storing a unique control code depending on whether or not the corresponding connecting point 74 is connected to the common point 80, as well as with a comparator for comparing a control signal, received via a data channel, with the control code stored in the memory referred to.

Because the connections 78 and 79 are position-bound, the position of the station determines by which control signal the associated data processor can be activated. This embodiment of the invention offers the advantage that only one line connected to a common point 80 is necessary for determining by which control signal a data processor associated with a station can be activated. This line can for instance be formed by a connection with the grounding, so that hardly any additional cabling is necessary.

According to the embodiment shown, each connection 76–79 has two connecting points 74, 75, each connected or not connected to the common point 80 according to a unique code.

Preferably, the maximum number of connections is sixteen and each connection is at least provided with four connections points, which, for each connection, are connected or are not connected to the common point referred to according to a unique configuration. In practice, there are virtually always sufficient connections available for the data processors each associated with a station. Naturally, each connection may, in addition to the connecting points connected to the common point, comprise connecting points for lines of, for instance, a bus and feeding voltage. These connecting points are not shown for convenience.

According to a further alternative embodiment of the invention, each of the connections for a data processor associated with a station comprises a comparator, in which a given control code associated with that connection is stored. In operation, the comparator compares each control signal with the control code stored and it activates the data processor connected to that connection if the control signal corresponds with the control code referred to. This embodiment of the invention offers the advantage that no cabling and connecting point are required for determining the control code of a given data processor associated with a station. Further, a start-up procedure is not necessary and the comparator can be of simple construction because it need not be programmable.

Instead of being arranged in a transport unit, the connections can be arranged along a connection unit, extending along the stations connected. As a consequence, the invention can also be used for apparatuses for preparing items to be mailed, in which the stations themselves are each equipped with means for passing the sheets to be processed.

Such a connection unit preferably comprises an extensible bellows, the maximum length of the bellows between two connections corresponding with the maximum distance between two connections of successive stations and the minimum length of the bellows between two connections corresponding with the minimum possible distance between two connections of successive stations. Thus, the cabling of the connection unit has a variable length, is neatly accommodated and protected against damage.

I claim:

1. A method for controlling an apparatus which prepares items to be mailed, the apparatus comprising a plurality of successive stations that include at least one sheet feeding station for feeding a sheet, a central data processor, a plurality of data processors each associated with a station, and a data channel for connecting said central data processor and the data processors each associated with a station, at least some of the data processors each associated with a station being connected to a connection that is associated with a position of the station in the apparatus, the method comprising communicating the data processors associated with stations and at least the central data processor by way of said data channel, selectively activating said data processors each associated with a station in response to given control signals, the position of said at least one sheet feeding station with which a data processor is associated determining in response to which of the given control signals said data processor is activated to control the feeding of a sheet by said at least one sheet feeding station.

2. A method according to claim 1, wherein, for distinguishing a first one of the connections from a next one of the connections, corresponding points of the respective connection are connected or are not connected to a common point for all connections, and including storing a unique control code in each of the data processors connected to said connections, each unique control code corresponding with the points of the respective connection connected to the common point, said step of selectively activating said data processors each associated with a station including activating a selected data processor by transmitting a control signal via said data channel which corresponds with the unique control code stored in said data processor.

3. A method according to claim 1, wherein each connection is connected to the central data processor via a separate selection line, said step of selectively activating a data processor connected to a selected connection for communication via the data channel including transmitting the control signal via the selection line associated with said selected connection.

4. A method according to claim 3, including, at start-up of the apparatus, successively activating each data processor connected to one of said connections for communication via the data channel while the central data processor transmits a message comprising a unique control code via the data channel, storing the message comprising a unique control code in the activated data processor, and thereafter transmitting a unique control signal via the data channel to activate the data processor in operation, the unique control signal transmitted via the data channel corresponding to the unique control code stored in said data processor.

5. A method according to claim 3, including, at start-up of the apparatus, successively activating each data processor connected to one of said connections for communication via the data channel, and the activated data processor transmitting a message via the data channel, the transmitted message comprising a unique control code which is stored in the central data processor in relation to the connection to which the activated data processor is connected, thereafter activating said data processor in operation by transmitting a unique control signal corresponding to said control code via the data channel.

6. A method according to claim 4, wherein a selection line connecting a connection to the central data processor is also connected to a sensor for detecting the presence of a sheet at the station connected to the selection line, said sensor, after the control codes for activating the data processors each associated with a station have been stored, transmitting a signal via the selection line to the central processor which is dependent upon the presence of a sheet in front of the sensor.

7. A method according to claim 3, wherein the step of transmitting the control signals for selectively activating the data processors connected to connections for communication via the data channel includes transmitting said control signals exclusively via said selection lines.

8. A method according to claim 1, wherein each of said connections includes a comparator in which a given control code associated with said connection is stored, the method including comparing each control signal with the stored control code through operation of the comparator and, upon agreement between the control signal and said control code, activating the data processor connected to said connection by said connection.

9. An apparatus for preparing items to be mailed, comprising a transport path for transporting sheets a plurality of successive stations along said transport path including at least one sheet feeding station and a folding station, a central data processor, a plurality of data processors each associated with a station, a data channel by means of which said data processors each associated with a station are connected for communication with at least the central data processor so that said data processors each associated with a station are activatable for communication via the data channel by a control signal, a unit extending along said transport path and carrying a plurality of connections, each of said connections being located at a position of a station along said unit, to which connections a respective data processor associated with a station in the respective position along the unit is connected and the connections determining in response to which control signals the respective data processors connected to those connections are to be activated.

10. An apparatus for preparing items to be mailed, comprising a plurality of successive stations, a central data processor, a plurality of data processors each associated with a station, a data channel by means of which said data processors each associated with a station are connected for communication with at least the central data processor so that said data processors each associated with a station are activatable for communication via the data channel by a control signal, a plurality of position-bound connections to which a respective data processor associated with a station is connected and which determine in response to which control signals the respective data processors connected to those connections are to be activated, the plurality of position-bound connections including a first connection and a next connection, each comprising at least one connecting point, the connecting point of the first connection being connected to a common point for all connections and the connecting point of the next connection not being connected to the common point, the respective data processors connected to the first and the next connection being equipped with a memory for storing a unique control code depending on whether or not said corresponding connecting point is connected to said common point, as well as with a comparator for comparing a control signal received via the data channel with the control code stored in said memory.

11. An apparatus according to claim 10, wherein the maximum number of connections is sixteen and each connection comprises at least four connecting points which, for each connection, are connected or are not connected to said common point according to a unique configuration.

12. An apparatus according to claim 9, wherein the connections are connected to the central data processor via individual separate selection lines.

13. An apparatus according to claim 9, wherein the unit extending along the stations is a transport unit having a plurality of mounting positions for stations, which mounting positions are each equipped with one of said connections, at least a part of said dam channel being incorporated into the transport unit.

14. An apparatus according to claim 12, wherein the unit extending along the stations is a transport unit having a plurality of mounting positions for stations, which mounting positions are each equipped with one of said connections, at least a part of said dam channel being incorporated into the transport unit, the transport unit being provided at each connection with a sensor for detecting passing items transported by the transport unit, said sensor being connected to the selection line associated with the corresponding connecting point.

15. An apparatus according to claim 13, wherein the central data processor is incorporated into the transport unit and is connected to a main processor.

16. An apparatus according to claim 9, wherein the unit extending along the stations is a connection unit.

17. An apparatus for preparing items to be mailed, comprising a plurality of successive stations, a central data processor, a plurality of data processors each associated with a station, a data channel by means of which said data processors each associated with a station are connected for communication with at least the central data processor so that said data processors each associated with a station are activatable for communication via the data channel by a control signal, and a plurality of position-bound connections to which a respective data processor associated with a station is connected and which determine in response to which control signals the respective data processors connected to those connections are to be activated, the position-bound connections being arranged along a connection unit which extends along the connected stations, the connection unit comprising an extensible bellows, the maximum length of the bellows between two connections corresponding to the maximum possible distance between two connections of successive stations and the minimum length of the bellows between two connections corresponding to the minimum possible distance between two connections of successive stations.

18. A transport unit for use in an apparatus for preparing items to be mailed, comprising a dam channel, mounting positions for a plurality of stations, a transport track extending along said mounting positions for transporting sheets along a plurality of said mounting positions, each respective mounting position being provided with a data processor connection for coupling a data processor associated with a station mounted at the respective mounting position to the data channel, and with means for assigning selected control signals transmitted via the data channel to a data processor connected to said data processor connection at the respective mounting position.

19. An apparatus for preparing items to be mailed, comprising a plurality of successive stations, a central data processor, a plurality of data processors each associated with a station, a data channel by means of which said data processors each associated with a station are connected for communication with at least the central data processor so that said data processors each associated with a station are activatable for communication via the data channel by a control signal, a plurality of position-bound connections to which a respective data processor associated with a station is connected and which determine in response to which control signals the respective data processors connected to those connections are to be activated, and a transport unit having a plurality of mounting positions for stations, each mounting position being provided with one of said connections, at least a part of the data channels being incorporated into the transport unit.

* * * * *